United States Patent [19]
Innis, Jr.

[11] Patent Number: 5,316,392
[45] Date of Patent: May 31, 1994

[54] COOLANT GUARD FOR ROLLING MILL OIL FILM BEARING ASSEMBLY

[75] Inventor: Charles L. Innis, Jr., Paxton, Mass.

[73] Assignee: Morgan Construction Company, Worcester, Mass.

[21] Appl. No.: 140,788

[22] Filed: Oct. 21, 1993

[51] Int. Cl.$^5$ .............................................. F16C 33/74
[52] U.S. Cl. .................................. 384/147; 277/184; 384/484
[58] Field of Search ............... 384/477, 481, 482, 484, 384/130, 147, 151, 153; 277/183, 184, 180

[56] References Cited
U.S. PATENT DOCUMENTS

| | | | |
|---|---|---|---|
| 3,433,541 | 3/1969 | Drabik | 384/147 |
| 4,435,096 | 3/1984 | Petros | 384/130 X |
| 4,455,856 | 6/1984 | Salter, Jr. et al. | 277/152 X |
| 4,898,479 | 2/1990 | Simmons | 384/130 |

*Primary Examiner*—Thomas R. Hannon
*Attorney, Agent, or Firm*—Samuels, Gauthier & Stevens

[57] ABSTRACT

A coolant guard for a rolling mill bearing assembly has a base flange and an angularly disposed sealing flange, both molded integrally of an elastomeric material. The base flange is reinforced by an embedded metallic hoop.

8 Claims, 3 Drawing Sheets

COOLANT GUARD FOR ROLLING MILL OIL FILM BEARING ASSEMBLY

BACKGROUND OF THE INVENTION

1. Field of the Invention

This invention relates to an improved reinforced coolant guard for use in oil film bearings of the type employed in rolling mills.

2. Description of the Prior Art

A typical rolling mill oil film bearing with a seal arrangement including a coolant guard is shown in FIG. 1. The roll 10 has an end face 12 joined by an intermediate tapered section 14 to a reduced diameter section 16 surrounded by a sleeve 18. The sleeve is keyed or otherwise secured to the roll neck, and is journalled in a bushing 20 fixed within a chock 22. Oil is supplied continuously between the sleeve and bushing, and a seal assembly generally indicated at 24 surrounds the intermediate tapered section 14 to prevent oil from escaping from the bearing and also to prevent externally applied cooling water and entrained contaminants such as dirt, mill scale, etc. from penetrating into the bearing.

The seal assembly 24 includes a flexible flanged neck seal 26 and a seal inner ring 28, both of which are carried on the roll for rotation therewith, and a seal end plate 30 and coolant guard 34, both of which are fixed in relation to the chock 22. This sealing arrangement is well known to those skilled in the art, and thus little if any further explanation is required, except perhaps with regard to the coolant guard 34.

The coolant guard comprises an elastomeric molded component having a radially extending mounting flange 36 and an integrally associated sealing flange 38. The mounting flange 36 is located in a circular recess 40 in the seal end plate 30, where it is surrounded by a circular shoulder 41. The recess 40 has a flat annular mounting surface 42 against which the mounting flange is secured by means of circumferentially spaced screws 44. When the mounting flange 36 is thus secured, the sealing flange 38 extends angularly into resilient sealing contact with the roll end face 12.

The coolant guard provides the first line of defense against the unwanted and potentially damaging ingress of cooling water and entrained contaminants into the bearing. It also cooperates with the seal inner ring 28 to establish a sealing labyrinth leading to a drain opening (not shown) in the seal end plate. Additionally, when the bearing is being removed from the roll neck, the mounting flange 36 contacts the outermost peripheral flange of the seal inner ring 28 and exerts through it a force sufficient to pull both the inner seal ring and the neck seal 26 off of the roll neck. In order to facilitate this pulling action, the stiffness of the mounting flange is elevated above that of the sealing flange by increasing its durometer hardness. Also, it will be understood that during rolling, the roll neck on the non-thrust side of the roll will have a tendency to shift or "float" axially with regard to the chock 22 due to thermal expansion, mechanical tolerances, etc. If kept within acceptable limits, this axial floating does not damage the bearing. The shoulder 41 serves as a stop against which the roll end face 12 can abut to limit axial floating and thereby safeguard internal bearing components from damage that might otherwise occur.

The coolant guard 34 is molded as a closed circular component sized to fit a given bearing diameter. It may be adapted to fit different sized bearings by removing an appropriately dimensioned circumferential segment, and by bending the remainder of the coolant guard around the axis of the different sized diameter bearing.

A potential difficulty with this type of arrangement is that during service the stiffer mounting flange 36 may exhibit a tendency to pull away from the mounting surface 42 of the seal end plate. Should this occur, the coolant guard's function could be impaired.

In the past, as shown for example in FIG. 2, coolant guards 34' have been reinforced with a metallic structural element 46 which includes a radial flange 48 positioned to resist pulling away from the mounting surface 42 of the seal end plate. However, the radial disposition of the flange 48 limits the ability of the coolant guard to flex about the axis of the bearing and thereby inhibits its adaptability to smaller bearing diameters.

SUMMARY OF THE PRESENT INVENTION

A primary objective of the present invention is to provide an improved internally reinforced coolant guard which effectively resists any tendency of the mounting flange to pull away from the seal end plate, while still retaining the flexibility necessary to adapt to smaller bearing diameters. This is accomplished by molding a reinforcing hoop into the mounting flange, with the width of the hoop extending in a direction parallel to the bearing axis and transversally with respect to the thickness of the mounting flange. Preferably, the hoop is metallic, and located radially outwardly of the circle of fasteners used to attach the mounting flange to the seal end plate.

DETAILED DESCRIPTION OF PREFERRED EMBODIMENT

Figure 1:
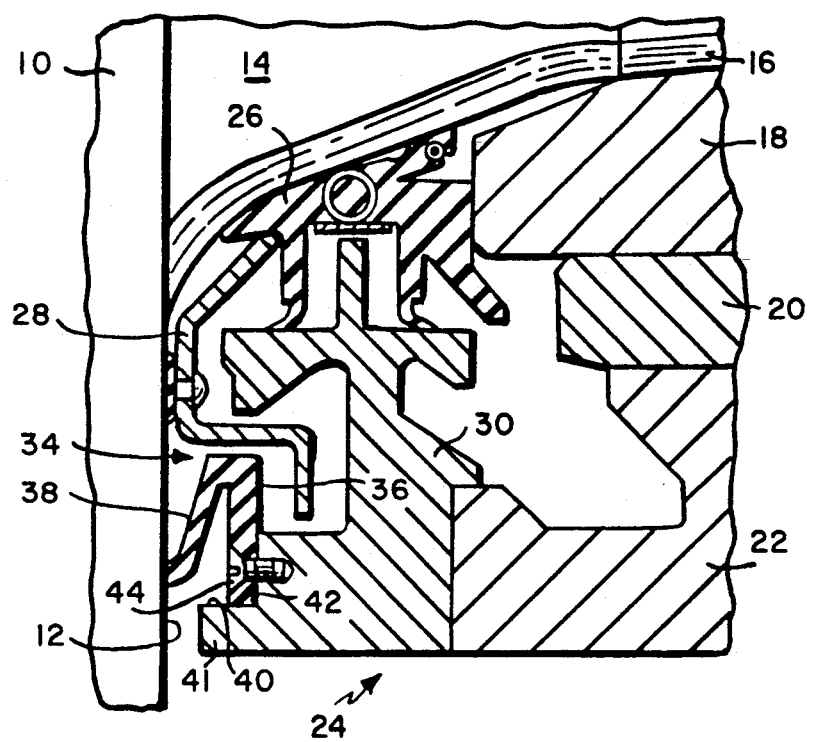
FIG. 1 is a partial view in cross section of a bearing assembly employing one form of conventional coolant guard.
Figure 2:
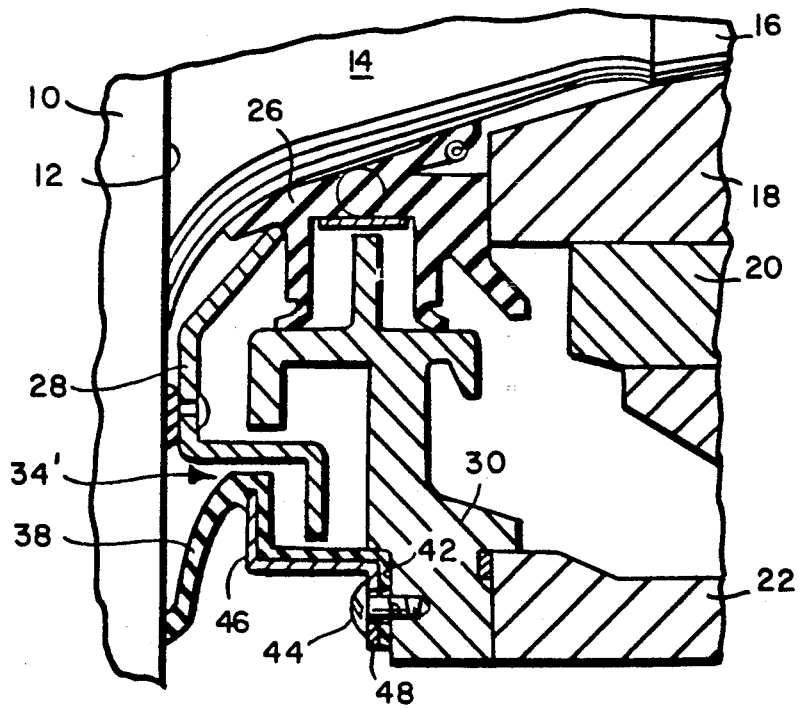
FIG. 2 is a view similar to FIG. 1 showing another conventional coolant guard.
Figure 3:
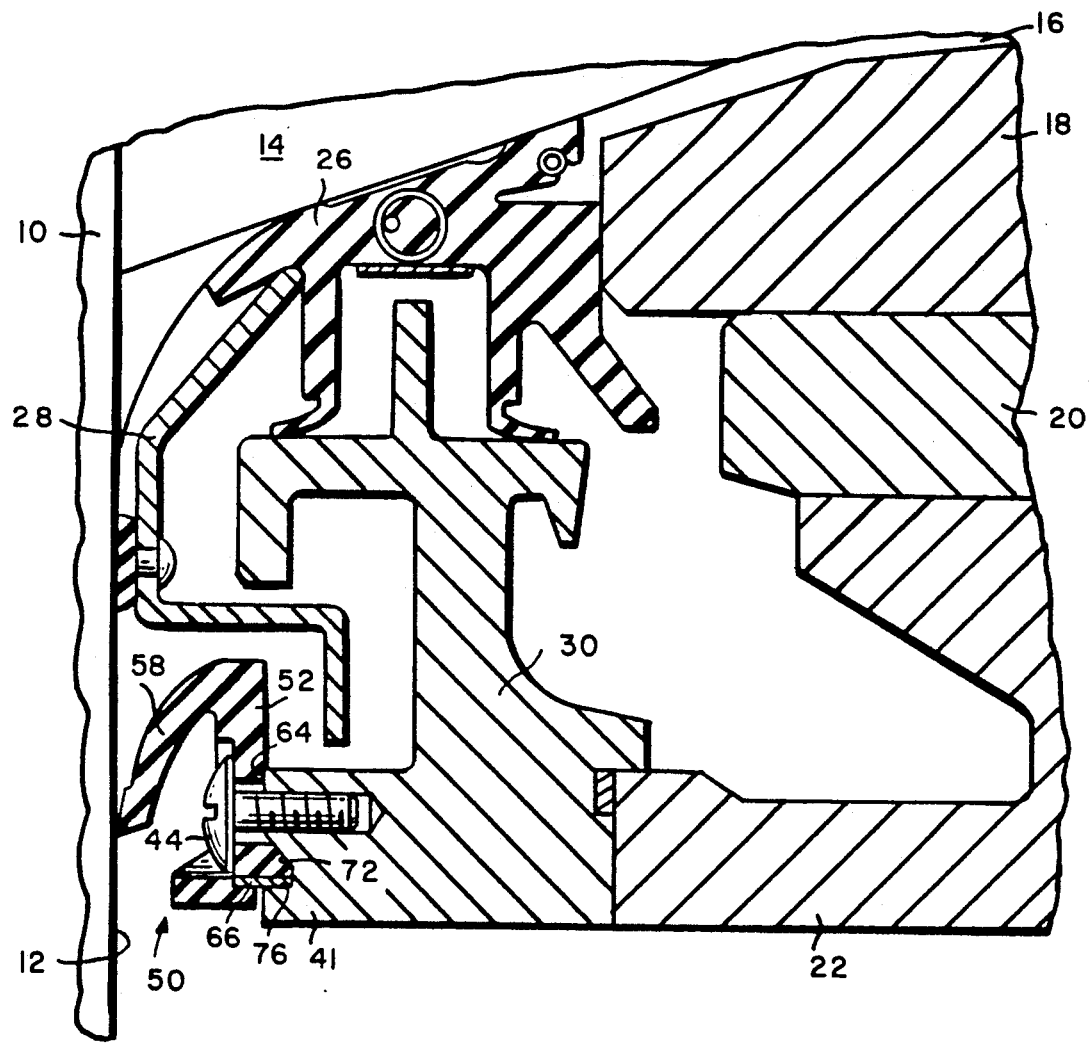
FIG. 3 is a partial cross sectional view on an enlarged scale of a bearing assembly including a coolant guard in accordance with the present invention.

FIG. 3 illustrates a bearing assembly incorporating a coolant guard 50 in accordance with the present invention. Other components of the bearing assembly which are the same or similar to those shown in FIGS. 1 and 2 have been designated by like reference numerals.

Figure 4:
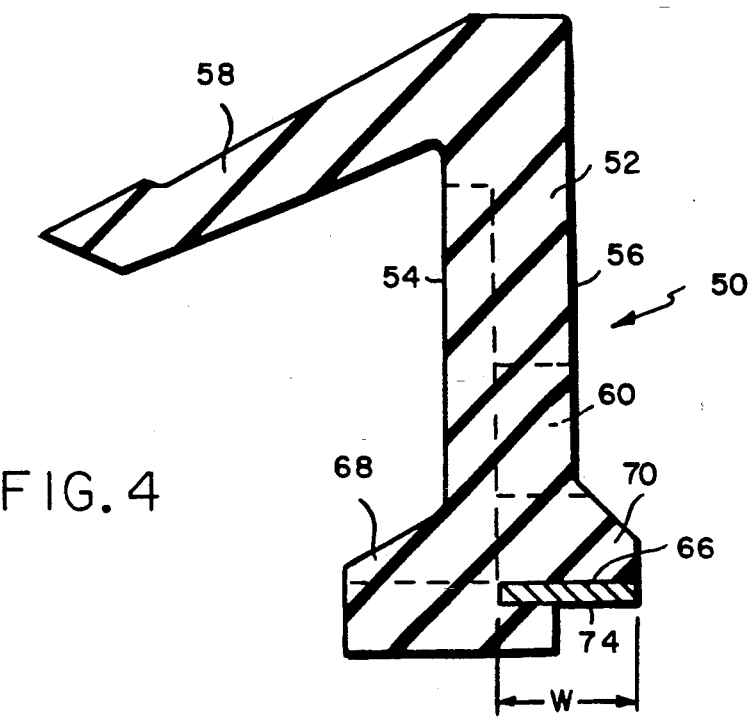
FIG. 4 is an enlarged cross sectional view of the coolant guard of the present invention.
Figure 5:
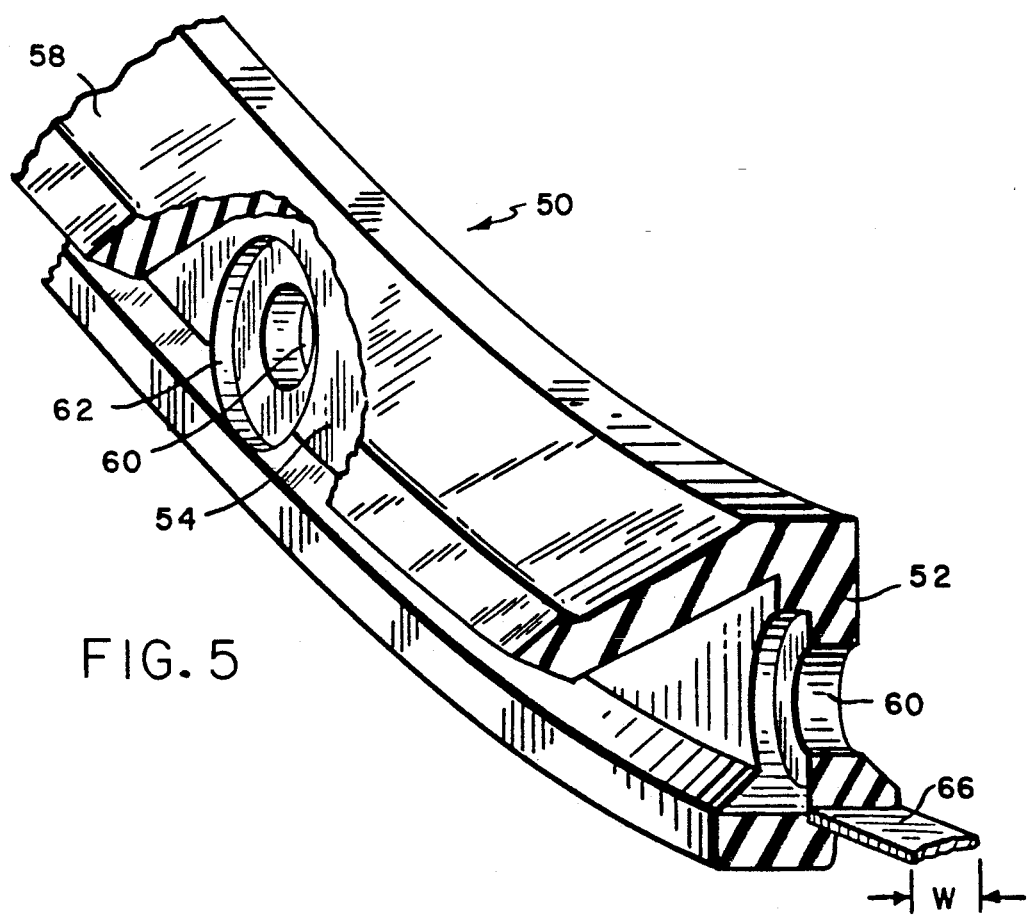
FIG. 5 is a partial perspective view, with portions broken away, of the coolant guard shown in FIG. 4.

Referring additionally to FIGS. 4 and 5, it will be seen that coolant guard 50 is molded of a suitable elastomeric material, and includes a radially disposed annular base flange 52 having planar front and rear surfaces 54, 56. A circular sealing flange 58 is integrally joined to the base flange 52 adjacent to its inner edge. The sealing flange extends angularly away from the front surface 54 of the base flange 52 into sealing contact with the end face 12 of the roll 10, as shown in FIG. 3.

The base flange 52 has circumferentially spaced apertures 60, each leading from the rear surface 56 to a countersunk recess 62 in the front surface 54. The apertures 60 accommodate machine screws 44 which serve to secure the base flange 52 to a mounting surface 64 on the seal end plate shoulder 41.

A metallic hoop 66 is embedded in the base flange 52 at a location disposed radially outwardly of the circle of apertures 60 and adjacent to the outer flange edge. The width "W" of the hoop extends in a direction parallel to the axis of the coolant guard and the roll neck 10.

The outer edge of the base flange is advantageously configured to define circular front and rear shoulders 68, 70 respectively protruding axially from the front and rear surfaces 54, 56. The rear shoulder 70 is received in a circular recess 72 in the mounting surface 64. Preferably the hoop 66 is partially embedded in the base flange, with a portion of the hoop being exposed to define an exterior surface 74 of the rear shoulder 70. The surface 74 is preferably stepped radially inwardly from the outer edge of the base flange.

The hoop is located such that its front edge is recessed inwardly from the plane of the front surface 54, with its rear protruding beyond the plane of the rear surface 56.

The hoop 66 effectively resists any tendency of the base flange 52 to axially distort away from the mounting surface 64. By the same token, the hoop accommodates radial flexure of the coolant guard, thereby enabling the coolant guard to be cut and bent into smaller circles.

As the screws 44 are tightened, the exposed surface 74 of the hoop 66 is urged radially outwardly and seated firmly against the base 76 of recess 72, thus reliably locating the water guard radially with respect to the axis of the bearing.

I claim:

1. In a rolling mill bearing assembly for rotatably supporting a roll neck, said bearing assembly having a non-rotatable flat annular mounting surface surrounding and perpendicular to the rotational axis of the roll neck, said mounting surface being spaced axially from an end face of the roll to define a gap therebetween, a flexible coolant guard for sealing said gap against the ingress of coolant and entrained contaminants into said bearing assembly, said coolant guard comprising:

a radially disposed annular base flange having planar front and rear faces and inner and outer edges, said rear face being adapted to be secured against said mounting surface;

a circular sealing flange integrally joined to said inner edge and extending angularly away from said front face and across said gap into sealing contact with the end face of the roll; and reinforcement means for accommodating flexible radial deformation of said coolant guard in relation to said axis while resisting any tendency of said base flange to distort axially away from said mounting surface, said reinforcement means comprising a hoop embedded in said base flange, the width of said hoop extending in a direction parallel to said axis.

2. The coolant guard of claim 1 wherein said hoop is metallic and said base and sealing flanges are molded from an elastomeric material.

3. The coolant guard of claim 1 wherein said base flange is provided with a plurality of circumferentially spaced apertures for accommodating fasteners used to secure said base flange against said mounting surface, said hoop being embedded in said base flange at a location disposed radially outwardly of said apertures.

4. The coolant guard of claim 1 wherein the outer edge of said base flange is configured to define circular front and rear shoulders respectively protruding axially from said front and rear faces, said rear shoulder being adapted to be received in a circular recess in said mounting surface.

5. The coolant guard of claim 4 wherein said hoop is only partially embedded in said base flange.

6. The coolant guard of either claims 4 or 5 wherein said hoop defines an exterior surface of said rear shoulder.

7. The coolant guard of claim 6 wherein said exterior surface is stepped inwardly from the outer edge of said base flange.

8. The coolant guard of claim 1 wherein said hoop has a front edge recessed inwardly from the front face of said mounting flange, and a rear edge which protrudes rearwardly beyond the rear face of said mounting flange.

* * * * *